(No Model.) 2 Sheets—Sheet 1.

S. FORTER.
REVERSE VALVE.

No. 577,019. Patented Feb. 16, 1897.

Witnesses
Samuel S. Mehard
M. W. Caskey.

Inventor
Samuel Forter,
by Wm. L. Pierce,
his Attorney (No Model.) 2 Sheets—Sheet 2.
S. FORTER.
REVERSE VALVE.
No. 577,019. Patented Feb. 16, 1897.
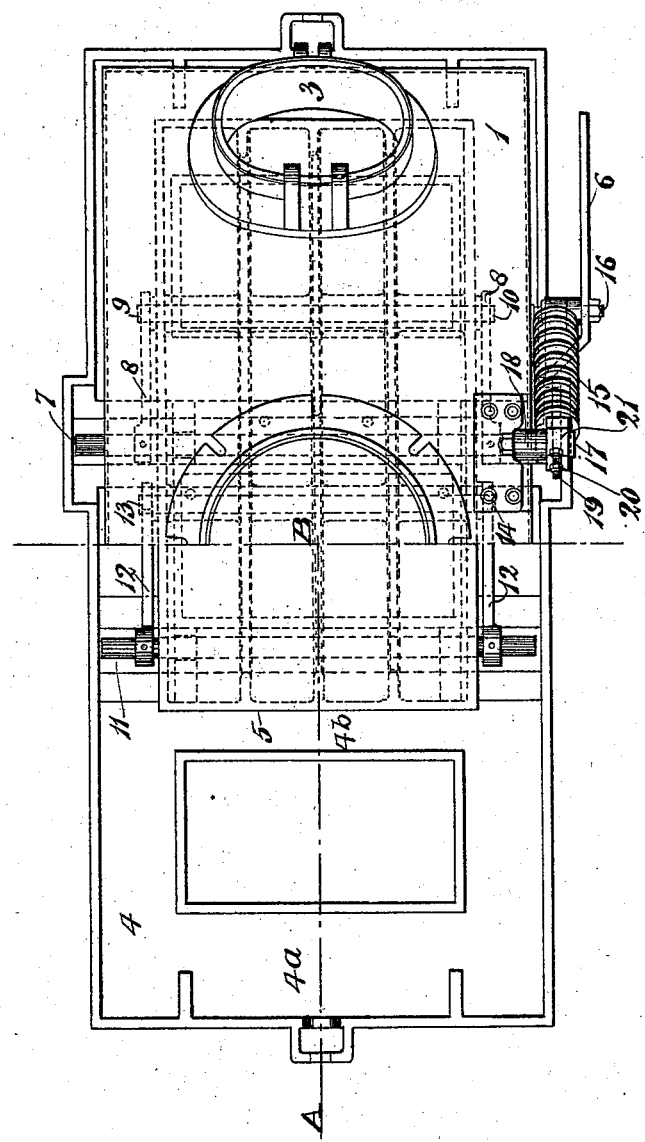
Witnesses
Samuel S. Mehard
M. W. Caskey.
Inventor
Samuel Forter,
by Wm L. Pierce,
his Attorney

UNITED STATES PATENT OFFICE.

SAMUEL FORTER, OF NEW CASTLE, PENNSYLVANIA.

REVERSE-VALVE.

SPECIFICATION forming part of Letters Patent No. 577,019, dated February 16, 1897.

Application filed September 11, 1896. Serial No. 605,494. (No model.)

*To all whom it may concern:*

Be it known that I, SAMUEL FORTER, a citizen of the United States, residing at New Castle, in the county of Lawrence and State of Pennsylvania, have invented or discovered new and useful Improvements in Reverse-Valves, of which the following is a specification.

Figure 1:
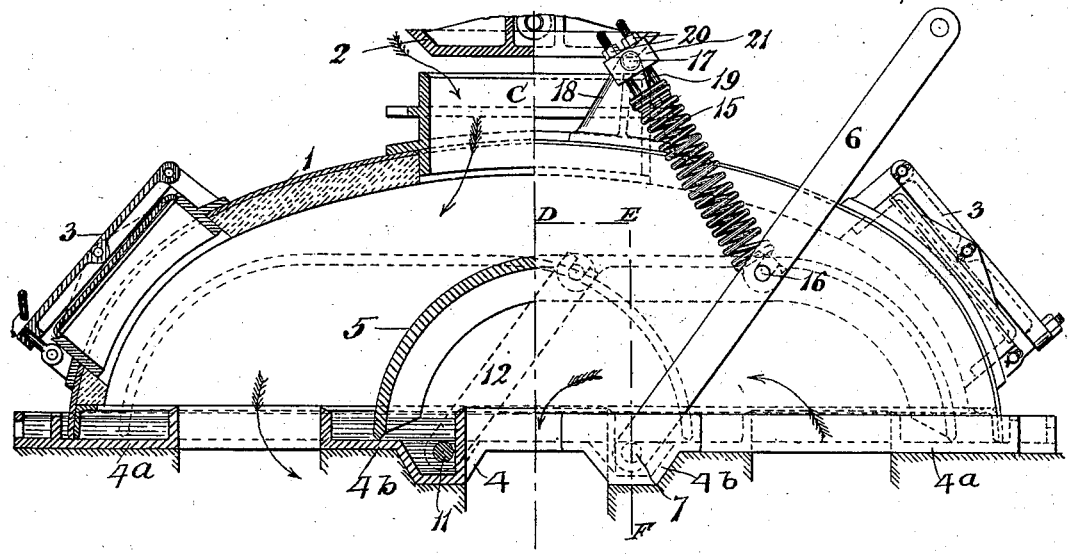
Figure 2:
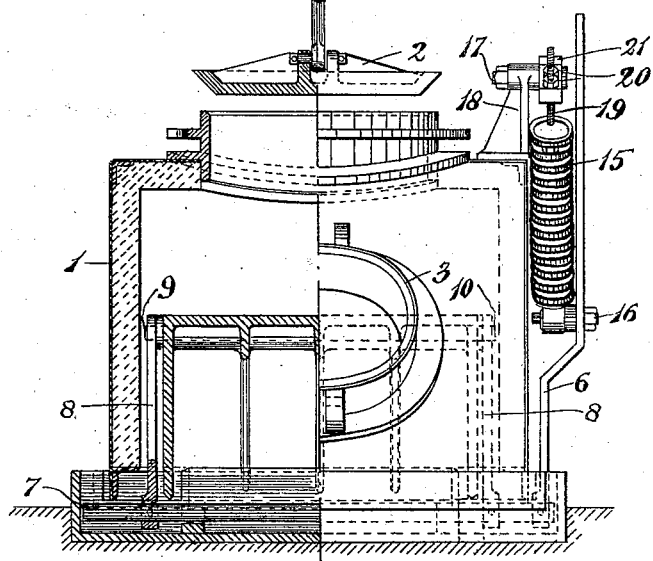

In the accompanying drawings, which make part of this specification, Figure 1 is a half-section on line A B of Fig. 3 and a half side view of my improvement. Fig. 2 is a half-section on line C D E F of Fig. 1 and half front elevation, and Fig. 3 is a half top view leaving casing off and a half top view with casing on.

My invention, generally stated, relates to reversible valves used in heating-furnaces for directing the currents of gas alternately to the right and left. It may be employed also in other structures where a shifting and water-sealed valve is required.

The primary purpose of my invention is to so water seal the valve that should the valve or its seat warp there will be no leakage of the gas. This is not possible with a valve which is merely water-cooled.

A further purpose of my invention is to locate the operating-shafts beneath the water seal and so prevent leakage of gas past them.

A third feature of my invention resides in the counterbalancing pivoted spring which balances the weight of the valve and assists in its reversal.

In the several views which constitute part of this specification, 1 is a brick-lined valve-casing resting in the water seal.

2 is a valve which controls the passage of gas or air to said casing. Said casing 1 is provided with the ordinary cleaning-doors 3 3.

4 is the bed-plate casting, which acts as a seat for the valve. Said bed-plate is provided with two outer water seals $4^a$ $4^a$, in which the valve-casing is sealed and also one edge of the valve, and two inner water seals $4^b$ $4^b$, in which the other edge of the valve is sealed.

5 is the valve itself, being any suitable shell, preferably cast-iron.

6 is the operating-lever, pinned at its lower end to shaft 7, which oscillates in suitable bearings in the bed-plate. Keyed to said shaft 7 and on each side of the valve are links 8 8, slotted at their upper ends to receive pins 9 10, cast integrally with the valve.

11 is a counter-shaft to shaft 7, supported in suitable bearings in the bed-plate and, like shaft 7, below the water seal.

12 12 are links keyed to said shaft and slotted at their upper ends to receive pins 13 14, cast integrally with the valve.

15 is a coiled spring pivotally connected with pin 16 on operating-lever 6 and also with pin 17 on bracket 18, secured to shell of valve-chamber.

19 19 and 20 20 are bolts and nuts for tightening the spring.

21 is a head-block which receives pin 17 and through which bolts 19 19 pass.

The operation of the device is apparent. As the lever 6 is moved to the left from the position seen in Fig. 1 spring 15 will assist in lifting the valve from its water seal and the valve will be moved laterally to the position shown in dotted lines in Fig. 1, dropping into the second water seals and reversing the flow of the gas or air. In the same manner the valve will be returned to its original position. The depth of the water seal is such that the inevitable warping of the valve or its seat will not separate the valve from its seal and no leakage will take place. At the same time shafts 7 and 11 are beneath the water-line, and thus leakage is prevented past the shaft.

Having described my invention, I claim—

1. The combination of a valve-seat provided with water seals; an oscillating reverse-valve adapted to be shifted from one set of seals to the other a shaft immersed in the water seal and links connecting said shaft with the valve.

2. The combination of a valve-seat provided with water seals; a valve-chamber resting in certain of said seals and an oscillating reverse-valve adapted to be shifted from one set of said seals to the other.

3. The combination of a valve-seat provided with water seals; an oscillating reverse-valve seated in said seals; an oscillating actuating-lever for said reverse-valve; an oscillating shaft immersed in the water seal and moved by said lever and connections from said shaft to the valve.

4. The combination of a valve-seat provided with water seals; an oscillating reverse-valve seated in one set of said seals; an oscillating actuating-lever for said reverse-valve; an oscillating shaft immersed in the water seal and moved by said lever; connections between said shaft and the valve; a second countershaft parallel with the first and also immersed in the water seal and connections between said shaft and the valve.

In testimony whereof I have hereunto set my hand this 9th day of September, A. D. 1896.

SAMUEL FORTER.

Witnesses:
  H. W. MIDDLEMIST,
  WM. L. PIERCE.